United States Patent [19]

Kantovich et al.

[11] Patent Number: 5,039,253
[45] Date of Patent: Aug. 13, 1991

[54] METHOD FOR TRENCHLESS LAYING OF PIPES AND AN ARRANGEMENT FOR CARRYING OUT THE METHOD

[76] Inventors: Leonid I. Kantovich, prospekt Mira, 74, kv. 55; Sergei M. Grigoriev, ulitsa Festivalnaya, 73, kv. 48; Anatoly P. Svechkopalov, ulitsa Konenkova, 14, kv. 132; Sergei A. Vasin, ulitsa Mytnaya, 58, kv. 13, all of Moscow, U.S.S.R.

[21] Appl. No.: 423,428
[22] PCT Filed: Jan. 13, 1989
[86] PCT No.: PCT/SU89/00006
§ 371 Date: Sep. 25, 1989
§ 102(e) Date: Sep. 25, 1989
[87] PCT Pub. No.: WO89/07178
PCT Pub. Date: Aug. 10, 1989

[30] Foreign Application Priority Data

Jan. 28, 1988 [SU] U.S.S.R. ............... 4372413

[51] Int. Cl.[5] ............... F16L 1/036
[52] U.S. Cl. ............... 405/184; 405/138; 405/154
[58] Field of Search ............... 405/132, 138, 142, 143, 405/145, 146, 150, 151, 154, 184

[56] References Cited

U.S. PATENT DOCUMENTS

| | | |
|---|---|---|
| 3,169,376 | 2/1965 | Cunningham . |
| 3,613,384 | 10/1971 | Jacobs ............... 405/146 X |
| 4,095,435 | 6/1978 | Uemura ............... 405/138 X |
| 4,146,347 | 3/1979 | Woods ............... 405/184 |
| 4,388,020 | 6/1983 | Uemura et al. ............... 405/138 |
| 4,432,667 | 2/1984 | Richardson ............... 405/150 X |

FOREIGN PATENT DOCUMENTS

| | | |
|---|---|---|
| 1091045 | 10/1960 | Fed. Rep. of Germany ...... 405/138 |
| 3122710 | 8/1985 | Fed. Rep. of Germany . |
| 662669 | 5/1979 | U.S.S.R. . |

OTHER PUBLICATIONS

Bestransheinaya ukladka truboprovodov, 1956, Gosudarstvennoe izdatelstvo literatury po stroitelstvu i arkhitekture, pp. 4–7.

N. Ya. Korshenbaum et al., "Prokhodka gorizontalnykh i vertikalnykh skvazhin udarnyn sposobom", 1984, Nedra, pp. 22–24.

Primary Examiner—Dennis L. Taylor
Assistant Examiner—John A. Ricci
Attorney, Agent, or Firm—Fleit, Jacobson, Cohn, Price, Holman & Stern

[57] ABSTRACT

Pipe sections are forced through the ground, separating from the mass of the ground its part received in these pipe sections. This part of the ground is evacuated with the sections. As the pipe sections are evacuated, a stationary pipe is layed. The pipe sections are forced into the ground by a main hydraulic power unit and an intermediate hydraulic power unit positioned between the pipe sections having each a cavity communicating with a hydraulic system and intended to exert pressure on the end of the preceding pipe section. This cavity is defined by two rings rigidly secured at the preceding section. The front end of the succeeding section having an annular sealing element is inserted in a clearance between the rings.

4 Claims, 6 Drawing Sheets

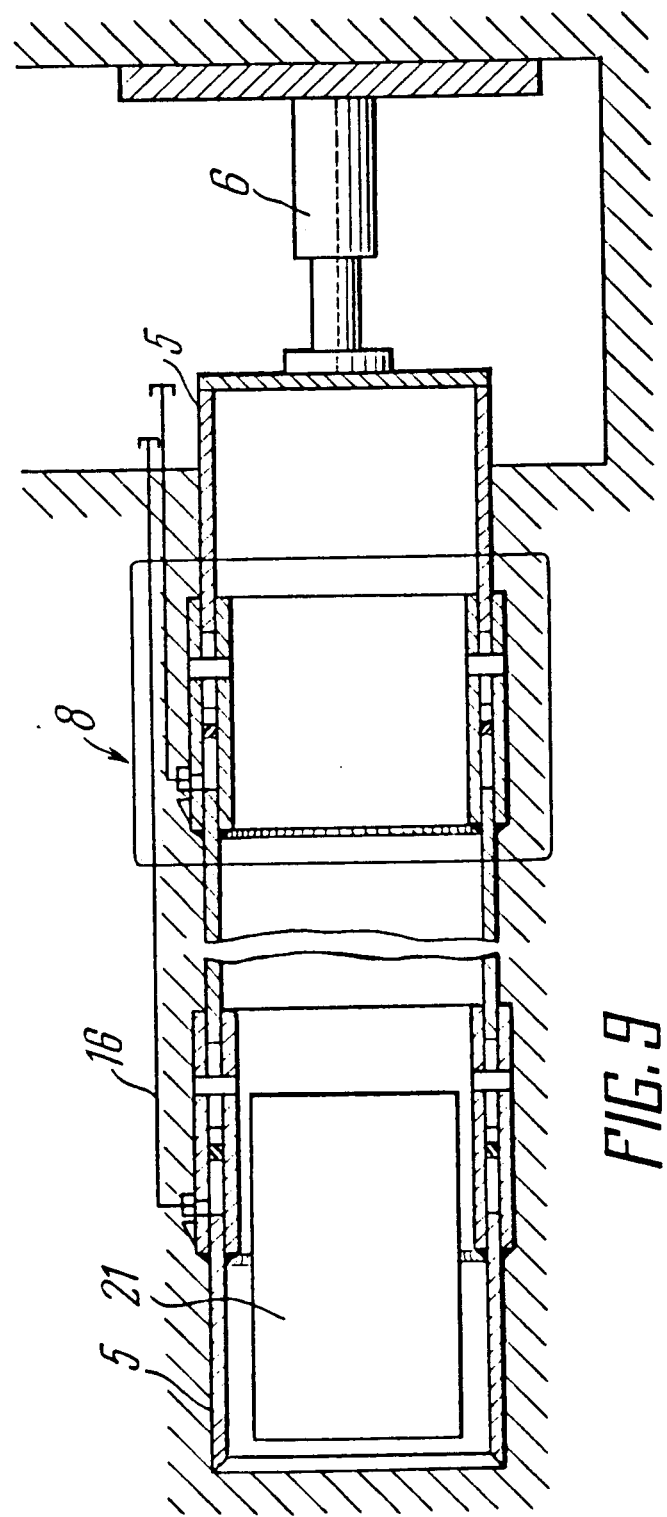

METHOD FOR TRENCHLESS LAYING OF PIPES AND AN ARRANGEMENT FOR CARRYING OUT THE METHOD

FIELD OF THE INVENTION

This invention relates generally to excavation and earth moving, and more particularly concerns a method for trenchless laying of pipes and an arrangement for carrying out the method.

The invention can be used with success for laying pipes 300-800 mm in diameter.

BACKGROUND OF THE INVENTION

There is known a method for trenchless laying of pipes in which a pipe is lowered down a vertical shaft and then forced through the ground in a preset direction.

An arrangement for carrying out the method comprises a power unit secured in a shaft chamber for forcing the pipes in the ground, and a device for evacuating the ground (cf., U.S.S.R. Inventor's Certificate 662,669).

A disadvantage of this method and arrangement is that the length to which the pipe can be forced into the ground is limited. This limitation is accounted for in that the entire force produced by the power unit is imparted to the end of the pipe inside the shaft, whereas the strength and rigidity of the pipe are low, making the pipe susceptible to deformation.

There is also known a method for trenchless laying of pipes in which pipe sections are forced through the ground in a preset direction, the pipe sections being lowered down one of vertical shafts and removed as they are forced through the ground from the second vertical shaft, after which a stationary pipe is layed. Forcing each pipe section is accompanied by removal of earth using screw conveyers and earth working equipment for evacuating the earth. In this method, use is made of pipe sections of a diameter substantially greater than the diameter of stationary pipes layed subsequently, which is necessitated by positioning in such pipe sections of the earth working and conveying equipment.

In addition, such methods require substantial technical facilities, and are very expensive.

An arrangement for carrying out this method comprises a power unit engageable with the rear end of each pipe section as they are forced through the ground, at least one intermediate hydraulic power unit positioned between two adjacent pipe sections and capable of relative movement as they are forced into the ground, and earth working and conveying means. The intermediate hydraulic power unit has the form of a hydraulic power cylinders arranged about the periphery inside the pipe sections (cf., West German Publication 3,122,710).

One disadvantage of the above arrangement resides in that in the confined space for working the ground, the hydraulic power cylinders of the intermediate power unit constrict the useful working space inside the pipe. This construction of the intermediate power unit makes access to the shaft chamber difficult and complicates evacuation of earth from the shaft, resulting in low efficiency of the arrangement. Another disadvantage is that the hydraulic power cylinders are rigidly secured to the adjacent thin-wall pipe sections, whereby substantial forces imparted by the cylinders can deform the pipe sections to result in low reliability of the prior art arrangement.

SUMMARY OF THE INVENTION

The present invention aims at providing a method for trenchless laying of pipes and an arrangement for carrying out the method in which pipe sections are forced through the ground and the ground is evacuated so as to result in more efficient pipe laying, reduce the amount of equipment used for pipe laying, and ensure that the method and arrangement could find application even for laying pipes 300-800 mm in diameter.

The aims of the invention are attained by a method for trenchless laying of pipes in which pipe sections are forced through the ground in a preset direction, these sections being fed to one of a plurality of vertical shafts, forced through the ground, and removed from a second vertical shaft while simultaneously laying a stationary pipe. According to the invention, in the course of forcing the pipe, sections lengthwise of the pipe the ground of a diameter equal to the inside diameter of the pipe sections is cut off from the ground mass to remain immobile relative to it inside the moving pipe sections as they are forced in the ground, and as the pipe sections enter the second shaft they and the ground present therein are evacuated from this shaft.

Evacuation of each pipe section together with the ground offers the following advantages: laying a stationary pipe without using special face working equipment for breaking the earth and means for conveying the earth from the pipe sections; laying a stationary pipe directly in ground, and possibility of laying the pipe, for example, in waterlogged grounds without special face supporting facilities; and laying pipes of substantial length.

The aims of the invention are further attanined by an arrangement for trenchless laying of pipes to carry out the method comprising pipe sections, a power unit engageable with a rear end of each pipe section as these pipe sections are forced through the ground, and at least one intermediate hydraulic power unit positioned between two adjacent sections capable of relative displacement as they are forced into the ground. According to the invention, the intermediate hydraulic power unit includes two coaxial rings rigidly secured at the rear end of the preceding pipe section to form an annular clearance therebetween accommodating a front end of the succeeding section. This front end is provided with an annular sealing element defining, with the rear end of the preceding section, an annular cavity communicating with a hydraulic system via a radial hole made in the outer ring, the rings having stops for limiting the movement of the succeeding section, the front end of which has longitudinal guides for the stops.

Preferably, the longitudinal guides for the stops have the form of through slots, whereas each stop is rigidly connected to both rings.

Advisably, a ledge for protecting a feeding line or the hydraulic system is secured at the outer ring close to the radial hole to avoid damage of the feeding line by the ground as the pipe section is forced therethrough.

The aforedescribed construction of the intermediate power unit is less complicated as compared with hydraulic power cylinders and occupies a smaller space in the interior of the pipe sections, which results in a smaller friction of the ground on the inner surface of the pipe sections. The construction also facilitates access to the ground to be removed when it is necessary to use special earth working and conveying means, such as for laying pipes of large diameters.

In addition, the force exerted on the end of pipe section makes it possible to prevent concentration of forces transmitted from one pipe section to another, whereby the pipe sections are less susceptible to deformation.

The proposed intermediate power unit has small dimensions, is more reliable, and enables, thanks to evacuating the ground together with the sections the pipe laying operation to be less labour consuming, less expensive and more efficient.

BRIEF DESCRIPTION OF THE DRAWINGS

The invention will now be described in greater detail with reference to a preferred embodiment thereof taken in conjunction with the accompanying drawings, in which:

FIG. 9 is a principle diagrammatic view of the proposed arrangement for trenchless laying of pipes making use of a mechanical means for evacuating the ground.

BEST MODE OF CARRYING OUT THE INVENTION

Figure 1:
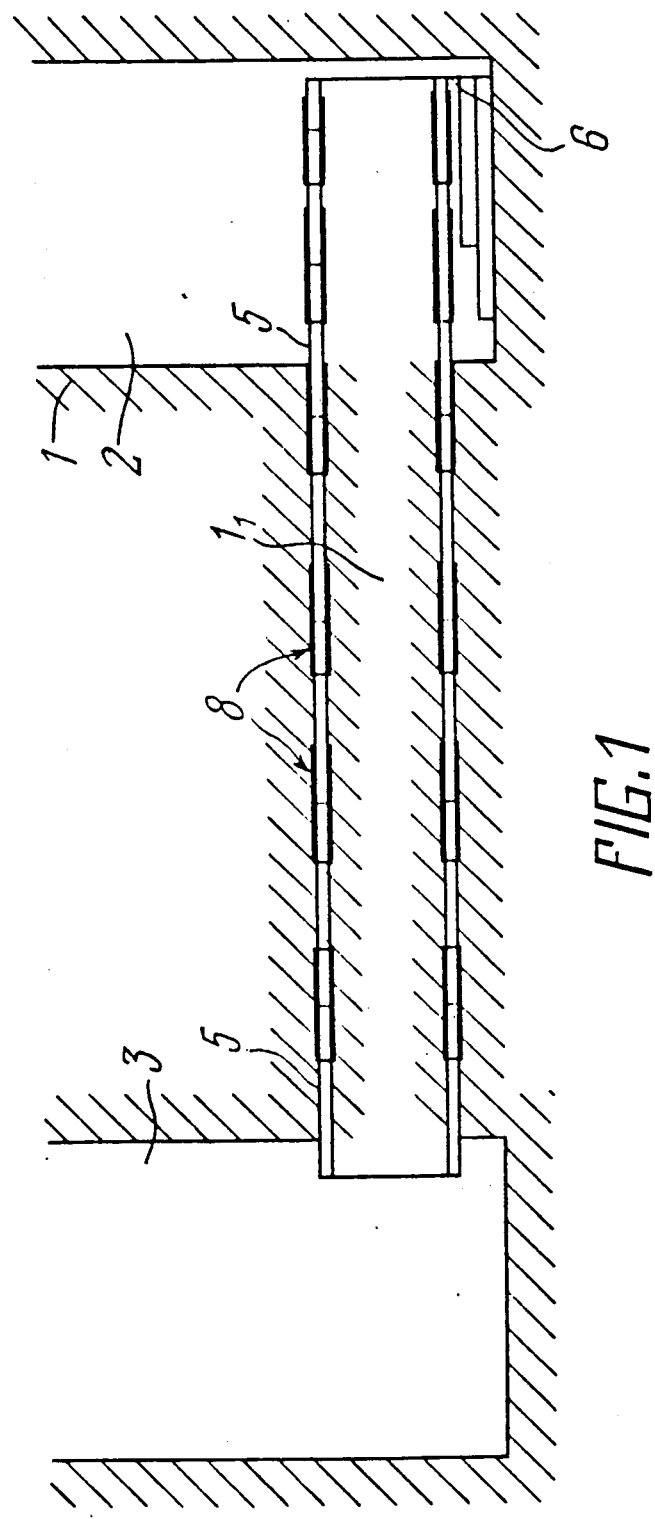
FIG. 1 is a schematic representation of the manner in which pipe sections are forced into the ground.
Figure 2:
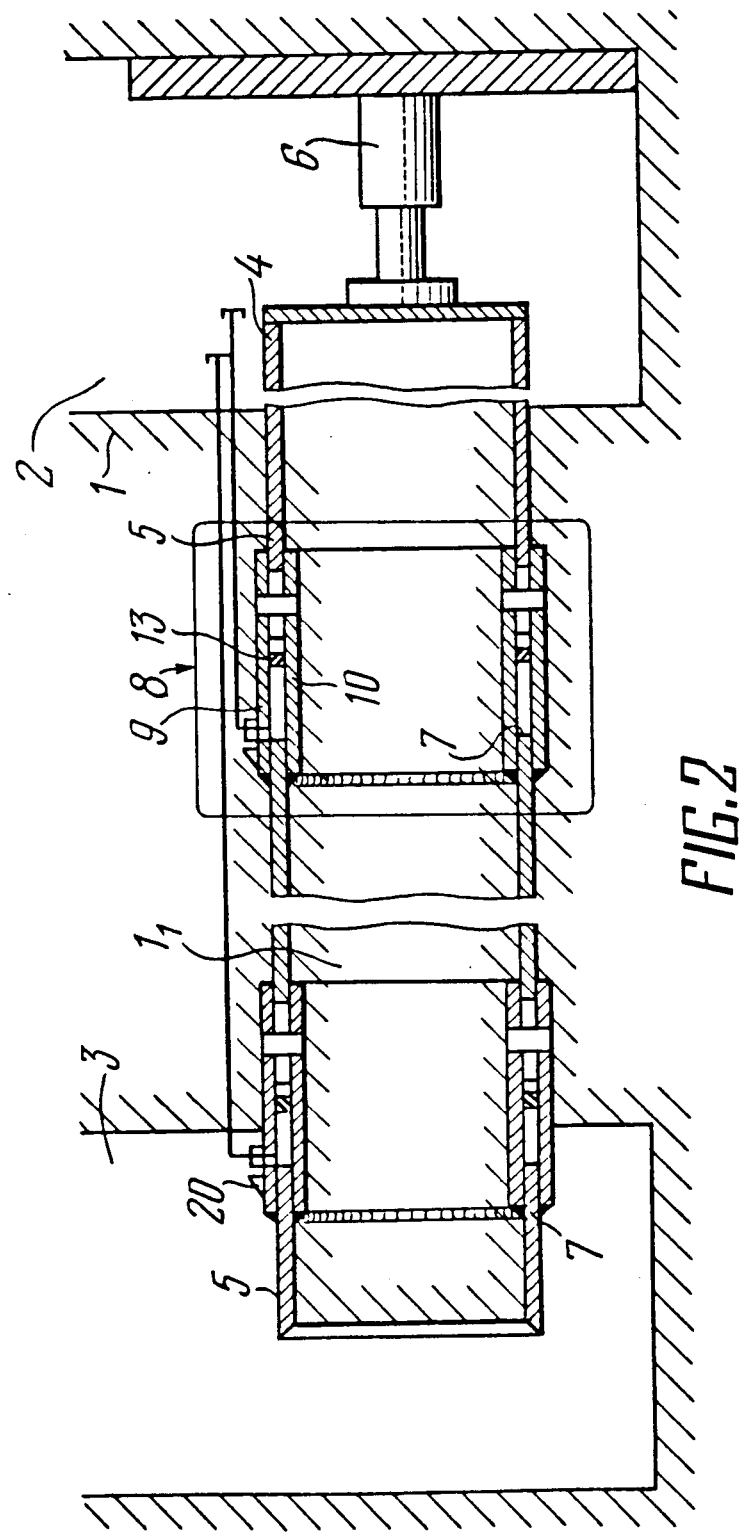
FIG. 2 is a principle diagrammatic view of an arrangement for trenchless laying of pipes according to the invention.

A method for trenchless laying of pipes resides in that two vertical shafts 2 and 3 (FIG. 1) are made in the ground 1 after which a stationary pipe 4 is layed in the ground 1 therebetween (FIG. 2). With this aim in view, pipe sections 5 are forced from the shaft 2 in a direction toward the shaft 3 through the ground 1. In the course of forcing the sections 5 to the shaft 3 these pipe sections are removed and the stationary pipe 4 is layed. As the section 5 is forced in the ground lengthwise of the pipe, the earth section $1_1$ of a diameter equal to the inside diameter of the section 5 is cut off thereby from the main mass of the ground 1 to be left immobile inside the pipe sections 5 moving toward the shaft 3. As the sections 5 enter the shaft 3, they are removed together with the soil they contain. The first pipe section 5 forced through the ground contains a quantity of the thus separated soil occupying the space immediately before the outlet to the shaft 3, since its removal is not hampered. Laying of the stationary pipe 4 is carried out in any known suitable manner as the pipe sections 5 containing earth $1_1$ are removed.

The apparatus for carrying out the proposed method comprises the following elements: pipe sections 5 (FIGS. 1, 2); a power unit 6 of any known suitable construction to exert action on a rear end 7 of each pipe section 5 and force it through the ground 1; and intermediate hydraulically operated power units 8, each such unit 8 being positioned between two adjacent sections 5 as shown in FIGS. 1, 2, 3 and 4; the sections 5 being capable of relative displacement as they are forced forward.

Each intermediate hydraulic power unit 8 (FIGS. 3 and 4) includes two coaxial rings, viz., outer ring 9 and inner ring 10. The rings 9 and 10 are rigidly secured at the rear end 7 of the preceding section 5 to form an annular clearance 11 (FIG. 3) therebetween. The clearance 11 accommodates a front end 12 of the succeeding section. Provided at the front end 12 of each succeeding section 5 is an annular sealing element 13 (FIG. 5), such as an elastic gasket held in place by a threaded element 14. The annular sealing element 13 defines with the rear end 7 of the preceding section 5 an annular cavity 15 communicable with a hydraulic system (not shown) by way of a feeding line 16 connected to a radial hole 17 made at the outer ring 9.

Figure 6:
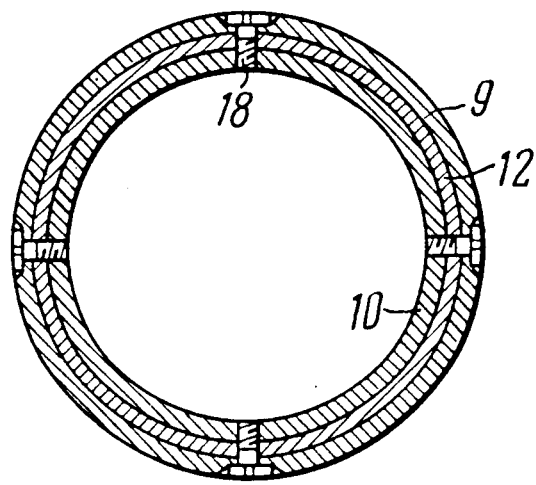
FIG. 6 is a section along line VI—VI in FIG. 4.

The rings 9 and 10 have stops 18 (FIGS. 4 and 6) for limiting the travel of the succeeding section 5 having, for example, the form of screws positioned as shown in FIG. 6, and connected to both rings 9 and 10. The front end 12 (FIGS. 3 and 4) of each succeeding section 5 has longitudinal guides in the form of through slots 19 to receive the stops 18.

Figure 3:
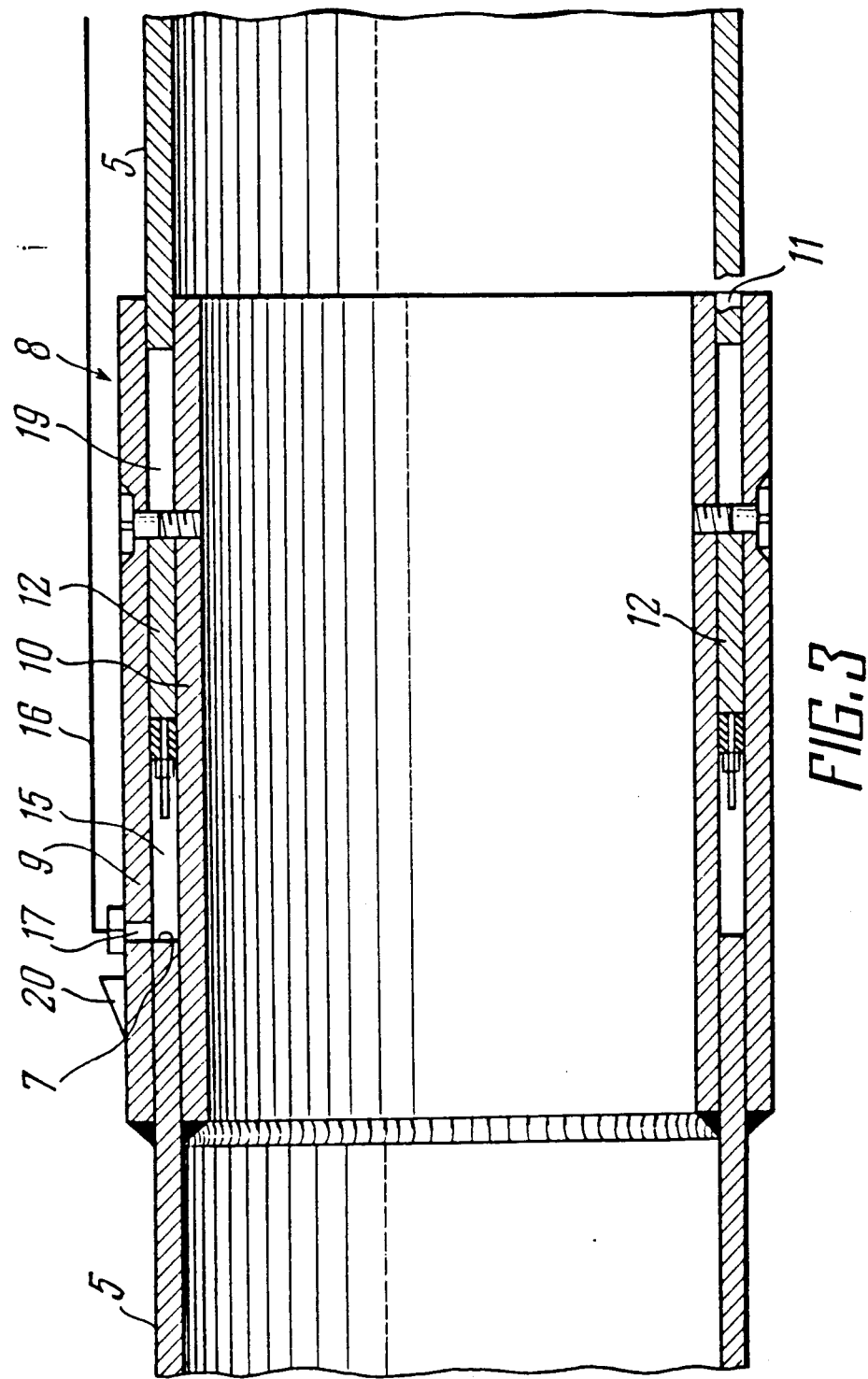
FIG. 3 shows, schematically, construction of an intermediate hydraulic power unit of the proposed arrangement.
Figure 4:
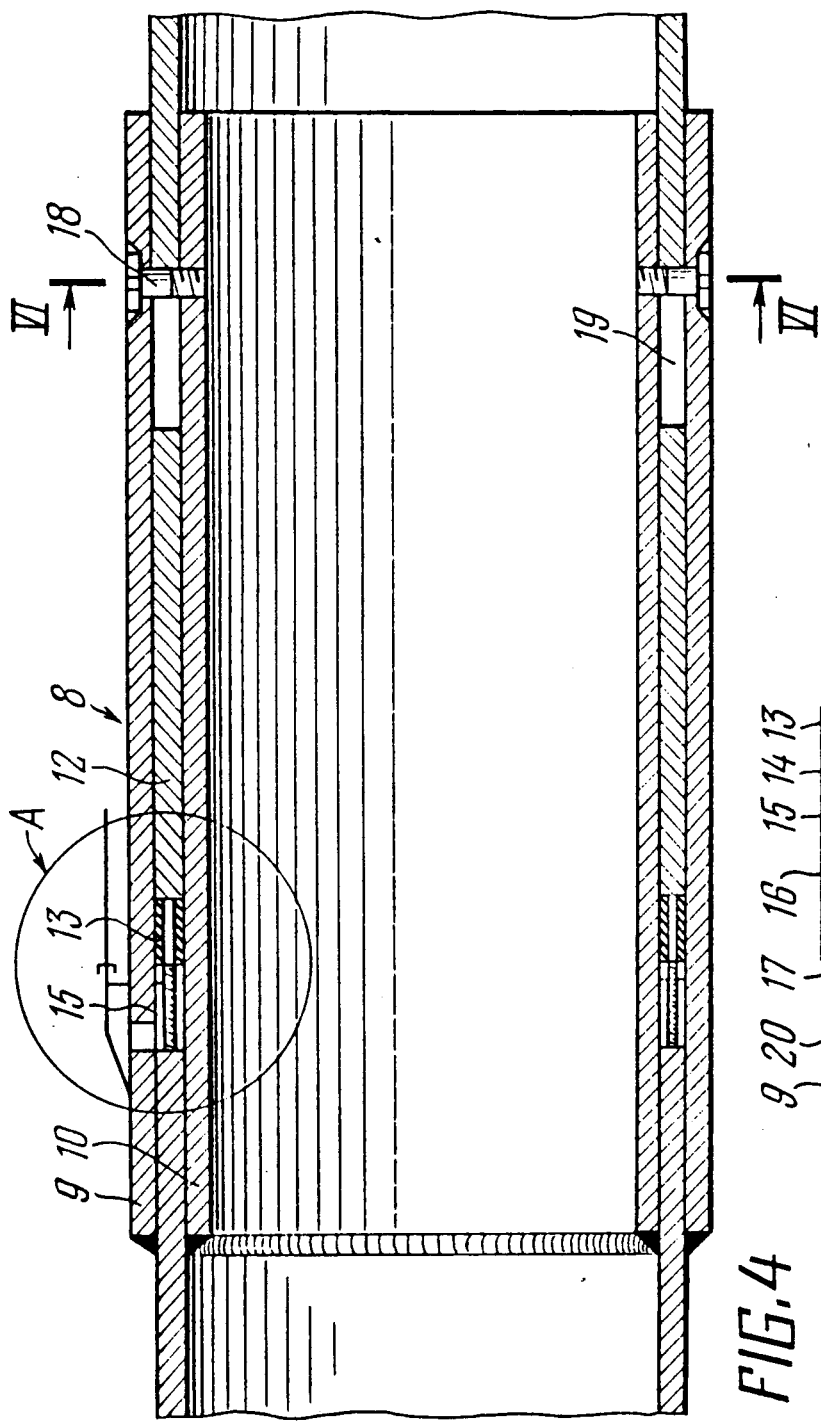
FIG. 4 shows the same as illustrated in FIG. 3 after movement of the successive pipe section.
Figure 5:
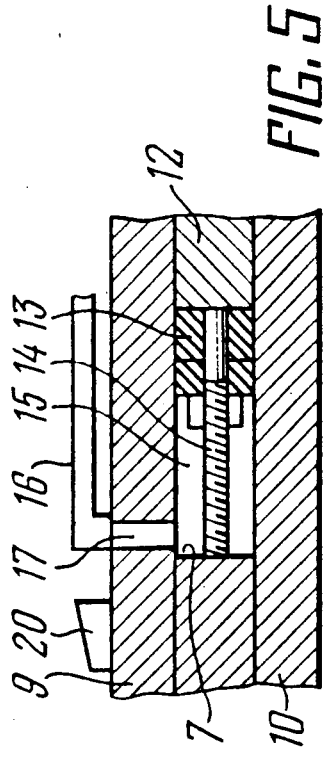
FIG. 5 shows part A in FIG. 4.

Provided at the outer ring 9 in proximity to the radial hole 17 is a ledge 20 intended to protect the feeding line 16 against being damaged by the earth as the pipe sections 5 are forced forward. The rings 9 and 10 are secured at the rear end 7 of the preceding section 5 with an overlap, as shown in FIGS. 3 and 4. However, these rings 9 and 10 can also be secured as shown in FIGS. 7 and 8.

Figure 7:
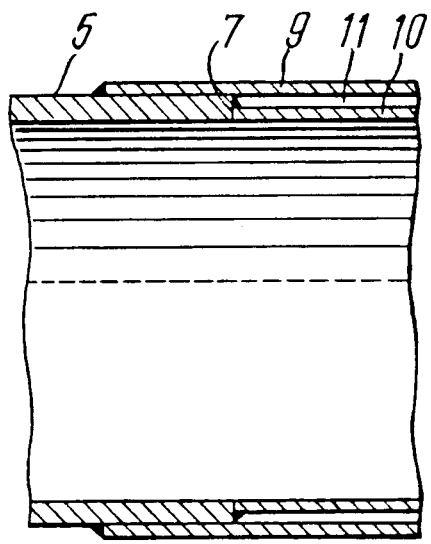
FIG. 7 shows the manner in which rings of the power unit according to FIG. 3 are secured.

In an embodiment shown in FIG. 7, the outer ring 9 is secured (such as by welding) to the outer surface of the pipe section 5, whereas the ring 10 has a thickness substantially smaller than the thickness of the end 7 of the section to be butt-welded to the end 7 as illustrated in FIG. 7 for forming the clearance 11 therebetween.

Figure 8:
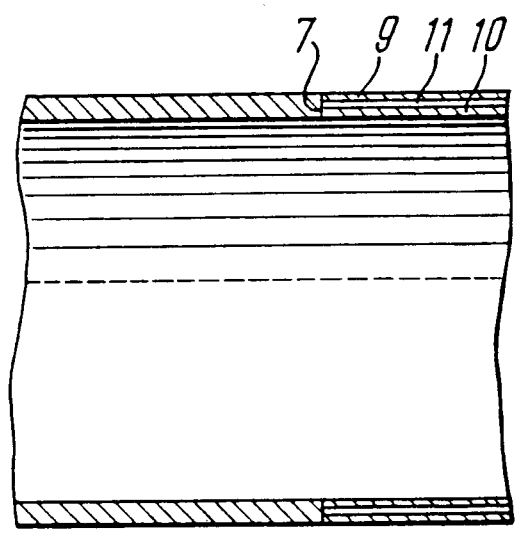
FIG. 8 shows an alternative manner in which the rings of the power unit according to FIG. 3 are secured.

Referring now to FIG. 8, the rings 9 and 10 have a thickness substantially smaller than the thickness of the end 7, and are secured in a butt-to-butt fashion immediately to the end 7 to define a clearance 11 therebetween, as seen best in FIG. 8.

The intermediate hydraulic power unit 8 can be formed immediately between two adjacent pipe sections when laying the pipe, or it can have the form of separate units installed between the pipe sections.

The proposed apparatus operates in the following manner.

The first pipe section 5 (FIG. 2) is forced from the shaft 2 by the power unit 6 exerting pressure on the end 7 of this section, whereby the section is forced into the ground 1, and the ground $1_1$ of a diameter equal to the diameter of this section is cut off from the ground mass to remain fixed relative to it, whereas the section 5 continues to move forward toward the shaft 3. Movement of the ground $1_1$ with the section 5 is hampered by the ground ahead of the section 5. After the first section is forced into the ground, the intermediate power unit 8 is mounted, or the front end 12 of the succeeding section carrying the sealing element 13 is introduced to the annular clearance 11 between the rings 9 and 10 secured at the rear end 7 of this section to be locked by the stops 18 insertable in the coaxial radial holes made in the rings 9 and 10 and extending through the slots 19 thereby forming the intermediate power unit 8. A pressure is applied from the hydraulic system (not shown) to the thus formed annular cavity 15 via the feeding line 16 and hole 17 in the rear end 7 of the first section to force the first section further into the ground to a distance equal to the length of the slot 19, the force thus applied being uniformly distributed at the end 7, which obviates crimping of the section, whereas the movement of the succeeding section is prevented by the power unit 6 acting on its end.

Then the next section 5 is forced by the intermediate power unit 8 as has been described described or directly by the power unit 6.

The cycle is then repeated.

After the first pipe section 5 is completely forced to the shaft 3, this section with the earth present therein is removed from the shaft 3 followed by forcing of the succeeding section filled with the earth to the shaft 3. As the sections containing soil are removed, a stationary pipe is pulled in or mounted saction by section in the free space.

When laying pipes of large diameter, such as over 1.0 m across, the earth can be evacuated by any known suitable device 21 (FIG. 9), which can have the form of a screw conveyer or any other ground breaking member with a transport means for evacuating the ground.

INDUSTRIAL APPLICABILITY

The proposed method for trenchless pipe laying can be used with success for laying pipes 300 to 800 mm in diameter, especially when other mechanical means for earth removal are difficult to use.

The proposed arrangement for trenchless laying of pipes can be used for laying pipes 300-800 mm in diameter (without mechanical means for evacuating the earth), as well as by using mechanical means for breaking and evacuating the ground when laying pipes of larger diameter.

What is claimed is:

1. A method for trenchless laying of pipes comprising the steps of:

forcing pipe sections through the ground in a preset direction to one of a plurality of vertical shafts formed in the ground, removing said pipe sections from a second vertical shaft while simultaneously laying a stationary pipe, cutting off the ground having a diameter equal to an inside diameter of the pipe sections from the ground mass to remain immobile relative to it inside the moving sections, and removing said pipe sections and the ground present therein as the pipe sections enter the second shaft.

2. An arrangement for trenchless laying of pipes comprising pipe sections (5), a power unit (6) engageable with a rear end (7) of each pipe section (5) as these pipe sections are forced through the ground, and at least one intermediate hydraulic power unit (8) positioned between two adjacent sections (5) capable of relative displacement as they are forced forward in the ground, characterized in that the intermediate hydraulic power unit (8) includes two coaxial rings (9 and 10) rigidly secured at the rear end (7) of the preceding section (5) to form an annular clearance therebetween accommodating a front end (12) of the succeeding section (5), this front end (12) being provided with an annular sealing element (13) defining with the rear end (7) of the preceding section (5) an annular cavity (15) communicating with a hydraulic system via a radial hole (17) made in the outer ring (9), the rings (9, 10) having stops (18) for limiting the movement of the secceeding section, the front end of which has longitudinal guides for the stops (18).

3. An arrangement as claimed in claim 2, characterized in that the longitudinal guides for the stops (18) have the form of through slots (19), whereas each stop (18) is rigidly connected to both rings (9 and 10).

4. An arrangement as claimed in claim 2, characterized in that a ledge (20) for protecting a feeding line (16) of the hydraulic system is secured at the outer ring (9) close to the radial hole (17).

* * * * *